United States Patent [19]

Iwao et al.

[11] 3,820,225

[45] June 28, 1974

[54] METHOD OF ASSEMBLING NUCLEAR REACTOR FUEL ELEMENT SPACER ASSEMBLY

[75] Inventors: Kumiy Roy Iwao, Lafayette; David Yee, San Leandro, both of Calif.

[73] Assignee: Continental Oil Company, Ponca City, Okla.

[22] Filed: July 12, 1972

[21] Appl. No.: 270,875

Related U.S. Application Data

[62] Division of Ser. No. 41,965, June 1, 1970, Pat. No. 3,746,617.

[52] U.S. Cl. .................................. 29/428, 29/446
[51] Int. Cl. .......................................... B23p 19/00
[58] Field of Search .......... 29/428, 446; 176/76, 78

[56] References Cited
UNITED STATES PATENTS

| | | | |
|---|---|---|---|
| 2,948,517 | 8/1960 | Cosner | 176/78 X |
| 3,287,231 | 11/1966 | Frisch | 176/76 X |
| 3,298,922 | 1/1967 | Prince et al | 176/78 |
| 3,301,764 | 1/1967 | Timbs et al | 176/78 |
| 3,301,765 | 1/1967 | Eyre et al. | 176/78 |
| 3,349,004 | 10/1967 | Lass et al | 176/78 |
| 3,368,945 | 2/1968 | Keller et al. | 176/78 X |
| 3,379,618 | 4/1968 | Frisch | 176/78 |
| 3,600,792 | 8/1971 | Valluy | 29/428 |
| 3,665,586 | 5/1972 | Jabsen | 29/428 |

FOREIGN PATENTS OR APPLICATIONS

| | | | |
|---|---|---|---|
| 1,519,656 | 2/1968 | France | 176/78 |

*Primary Examiner*—Charlie T. Moon
*Attorney, Agent, or Firm*—Ronnie D. Wilson

[57] ABSTRACT

A nuclear reactor fuel element spacer arrangement having a fuel rods supporting and spacing means in the form of resilient slotted spacer tubes mounted on tie rods or bars secured to a supporting sleeve. The spaces between the spacer tubes are such that the fuel elements are gripped between adjacent spacer tubes or between spacer tubes and portions of the sleeve. The arrangement facilitates loading of the fuel elements and minimizes scratching of the fuel elements.

3 Claims, 5 Drawing Figures

PATENTED JUN 28 1974 3,820,225

METHOD OF ASSEMBLING NUCLEAR REACTOR FUEL ELEMENT SPACER ASSEMBLY

This is a division, of application Ser. No. 41,965, filed June 1, 1970, now Pat. No. 3,746,617.

This invention relates to nuclear fuel assemblies of the type comprising a bundle of fuel rods and more particularly to means for supporting and spacing the fuel rods in an assembly.

An object of the invention is to provide effective restriction of lateral motion of the fuel rods held in an assembly of such rods.

Another object is to make provision for preserving the integrity of the fuel elements.

Another object is to enhance the flow of coolant in the assembly.

Still another object is to facilitate the making of the assembly.

An assembly of fuel rods commonly used heretofore has involved arranging a number of fuel rods containing fissionable material in a parallel array and confined within an area, for example a square cross-sectional area, for the assembly. Provision has been made for coolant to flow past the spaced fuel rods within the space between rods and parallel to the axes of the rods so that the heat generated by the fissionable material in the rods is transferred to the coolant for such utilization as may be desired. The bundle of rods is ordinarily held at its opposite ends, and since the fuel rods have a degree of flexibility which would permit lateral motion at positions between the ends, it has been common to maintain the spacing pitch between rods and to restrict the lateral motion of the rods at positions between their ends while providing freedom for each rod to move axially under thermal expansion.

It is well known that restriction of lateral motion of the fuel rods is necessary to avoid undesirable effects such as neutron peaking, i.e., a concentration of peaking of the distribution of neutrons at a point of contact of rods, and flow channelling, i.e., a preferential flow of coolant in one of several interconnected parallel flow channels, which can cause hot spots to develop on the rods. A further reason for desiring lateral restriction is to dampen vibrations that can lead to undesired fretting of the fuel rods, i.e., the mechanical abrasion which can occur, for example, if a fuel rod were to rub against a spacer.

For the purpose of maintaining the fuel rods in their appointed positions and spacings in the assembly and for restriction of the lateral motion, grid-like spacers for the rods have heretofore been provided.

The grid spacers heretofore generally in use for the purpose of restricting the lateral motion of the fuel rods have utilized a grid of sheet metal in what may be called an egg-crate arrangement and provided with some form of spring fingers to grip the rods. In order to make such a grid spacer into a rigid integral unit and free from crevice corrosion, it has been a practice to braze the grid corners. Such a fabrication procedure has been costly as it has involved the steps of stamping grid plates, forming spring fingers into plates, assembling, brazing and then age hardening to obtain spring resiliency. Since such a grid spacer is fully assembled before the inclusion of the fuel rods, the fuel rods would then be inserted into the assembled grid spacer, which can cause scratching of the fuel rod surface.

A common form of fuel rod comprises a tubing of a material such as zircalloy containing fissionable material, the tubing being commonly coated with an oxide which acts as a protective coating. When such a fuel rod tubing is inserted through a pre-assembled grid the oxide coating can be scratched off. Since the spacer must have resilience and strength, the spacer material is ordinarily a relatively hard metal such as Inconel-X, a nickel base alloy containing copper among some other ingredients, available from International Nickel Company, Huntington, West Virginia. The Inconel is harder than a fuel rod tubing material like zircalloy, and this can cause the rod tubing to wear where it is in contact with the spacer grid. Furthermore Inconel has a relatively high neutron cross-section, i.e., it tends to absorb neutrons thereby decreasing the population of neutron available for fissioning.

In accordance with the present invention there is provided a grid spacer design in which there is less metallic mass than in prior spacer designs, and hence less restriction of the flow of coolant by the fuel rods and grid materials and also less absorption of neutrons. Furthermore the usual brazing operation is made unnecessary and scratching of fuel rods during assembly is avoided. Use of the present invention permits a stacking procedure during assembly of the fuel elements which reduces the possibility of scratching the fuel rod surfaces. Moreover, use of the present invention permits accommodation of variations in fuel rod diameters due to fabrication tolerances.

The invention is carried out by arranging a plurality of hollow spacer tubes with their longitudinal axes parallel to each other, the tubes being mounted on tie rods whose opposite ends are fastened to opposite sides of a sleeve which encompasses the array of spacing tubes. The spacing tubes are made of a resilient flexible material and are split longitudinally to form a longitudinal slot, which due to the resilience of the material can be squeezed to a more closed condition.

According to a preferred feature there are two sets of tie rods, the tie rods of one set extending parallel to each other in one direction and the tie rods of the other set extending at an angle, preferably perpendicular, to the tie rods of the first mentioned set. There is thus provided an array of spacing tubes within the sleeve such that spaces exist between groups of four of the spacer tubes, and each of these spaces is of the proper dimensions so that a fuel rod may be inserted between the spacer tubes of any group of four, in the direction parallel to the longitudinal axes of the parallel spacer tubes. The fuel rods are thus in contact with, and gripped with pressure by, each of the four spacer tubes in the group. This creates a tendency to close the slots of the resilient spacer tubes which thus exert their resilient pressure against the fuel rods.

According to an optional feature, the sleeve is shaped so that fuel rods can be snuggly fit between the wall of the sleeve and adjacent ones of the spacer tubes. When all of the spaces between the spacer tubes and between the outer spacer tubes and the surrounding sleeve are filled there results an array of parallel fuel rods.

The invention will be better understood from the following detailed description and the accompanying drawings of which:

Figure 1:
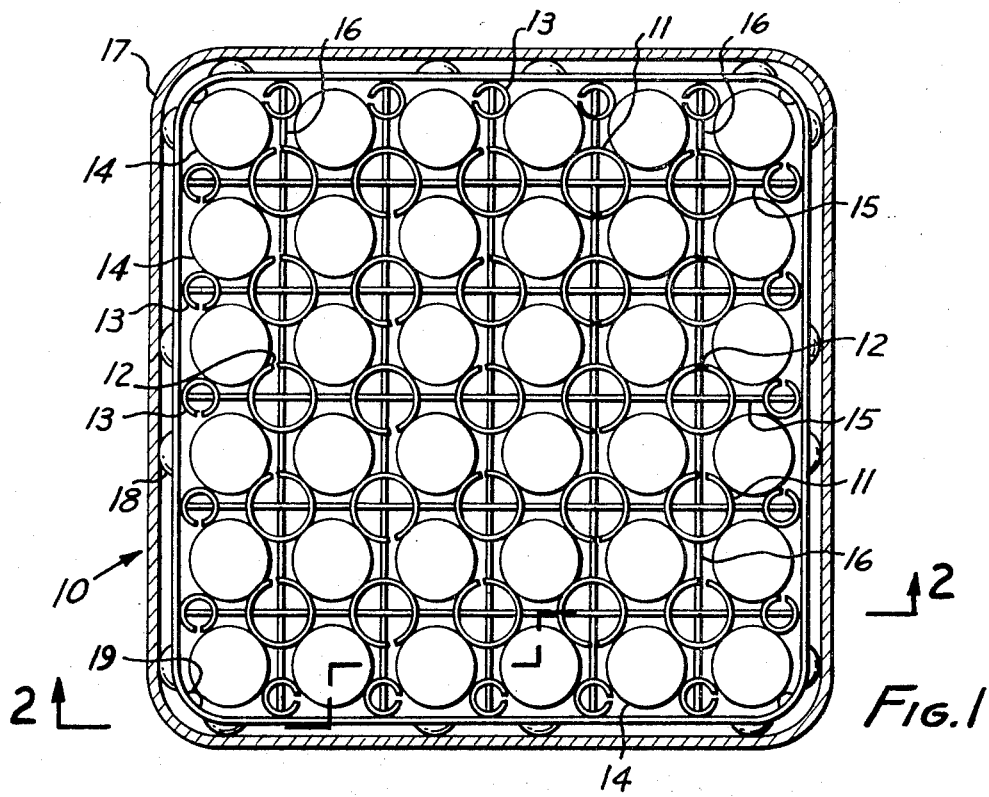
FIG. 1 is a top cross-sectional view of a nuclear fuel rod spacer assembly according to this invention.
Figure 2:
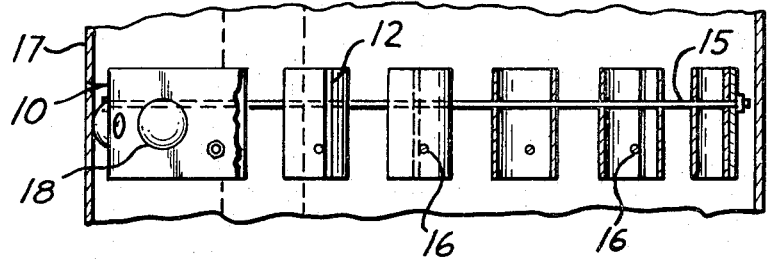
FIG. 2 is a side view in cross-section taken at line 2—2 of FIG. 1.

Referring to FIGS. 1 and 2 there is shown a nuclear fuel rod spacer assembly for supporting nuclear fuel rods, ordinarily in a vertically extending position, in an array within an area bounded by a sleeve comprising a strip 10 formed into an enclosure shown as a square shape having rounded corners. There are placed within the square enclosure a number of parallel rows of spacer tubes 11, all of equal dimensions, the rows being spaced equal distances apart from each other and the spacer tubes of each row being equi-distance apart from each other. The respective spacer tubes of each row form, with the corresponding tubes of the other parallel rows, a number of straight columns parallel to each other and perpendicular to the rows. Since this assembly presents a square pitch array there are as many spacer tubes 11 in each row, as there are in each column, which in the example illustrated, as five spacer tubes.

Each of the spacer tubes 11, all of the same diameter and axial length, is made of a flexible resilient material and formed with an axially extending slot 12 in its circumferential wall.

In addition to the hollow spacer tubes 11 there are provided at each end of each row of tubes 11, a hollow spacer tube 13, all of which are of the same diameter and axial extent as the tubes 11, but of smaller diameter than the spacer tubes 11. The tubes 13 have axially extending slots in their circumferential walls, like the slots of tubes 11. Furthermore, one of the small tubes 13 is situated at opposite ends of each column of spacer tubes 11. Thus, there is a row of small spacer tubes 13 along two opposite sides of the square enclosure 10 and also a column of the small spacer tubes 13 along the remaining opposite sides of the square enclosure. The dimensions, spacing and positions of all the spacer tubes, including the larger spacer tubes 11 and the smaller spacer tubes 13, are such that fuel rods 14, which are all of the same diameter, can be fitted into the spaces between each four adjacent spacer tubes.

The spacer tubes are supported in their positions by tie rods 15 and 16, the tie rods 15 being all parallel to each other and the tie rods 16 also being parallel to each other and perpendicular to tie rods 15. Each tie rod is fastened at its opposite ends to opposite sides of the square enclosure 10.

Each of tie rods 15 extends diametrically through each spacer tube 11 of a row and also through the end spacer tubes 15 of each row. For the purpose of this mounting, each spacer tube is provided with holes through its opposite sides so that the rods can extend through. The set of tie rods 16 are placed in a different plane, that is off set from, the plane of the tie rods 15 and the holes through the tubes for tie rods 16 will be located at the proper angle from the holes for tie rods 15. The spacer tubes are slidable along the tie rods but when assembled they are held in place by the fuel rods 14 and the outer sleeve 10. The preferred material for the outer sleeve, spacer tubes and tie rods is zircalloy.

The spacer tube slots 12 provide a spring action for the respective spacer tubes, which is determined by the choice of the spacer tube material, and its length, diameter and thickness, such that when a tube slot is open the spring rate will be lower than when the spacer tube is compressed to close the slot. The open condition of the slots functions to accommodate fabrication tolerances and the closed position of the slots serves to restrict lateral motion of the fuel rods. The spacer tube slots are oriented to tend to force each fuel rod in the same direction. Thus, the successive spacer tubes of each row have their slots facing in opposite directions, that is, a slot of one tube faces in one direction along the line of a tie rod 16 while the slot of the next adjacent spacer tube faces in the opposite direction along its tie rod 16.

The assembly is preferably accomplished by building it up row by row. This can be done, for example, by providing an upper and a lower means (not shown) for holding the fuel tubes in their assigned vertical positions shown in FIG. 1, and aligning the sleeve 10 in a position vertically between these upper and lower tube gripping devices. After placing a row of the smaller spacer tubes 13 on their tie rods, which will have an end extending through the adjacent side of the sleeve 10, a row of fuel rods 14 is placed along this side of the square sleeve in contact with respective ones of the last mentioned spacer tubes 13, with the fuel rods held from above and below by the tube gripping means in their proper spaced positions in the row. Then the adjacent row of the larger spacer tubes 11 is placed in position and the related tie rods run through them. Then the next row of fuel tubes are set into their positions followed by the succeeding row of spacer tubes on their tie rods. In this manner the rows of fuel tubes and spacer tubes are built up row by row in the array. When all of the rows of tubes are in position, the perpendicular sets of tie rods 15 and 16 are fastened through the opposite sides of the sleeve in their respective positions. The tie rods can be fastened to the respective sides of the sleeve as by crimping, bending, screw nut, welding or other suitable means.

For utilization in a nuclear reactor, the assembly held within the sleeve 10 is placed within a channel 17, shown in the same general square shape as the sleeve 10. For the purpose of fitting the sleeve snuggly within the channel, the sleeve is provided with a number of outwardly extending protrusions 18 of sufficient dimension and resiliency to enable the sleeve to fit snuggly within the channel. In order to engage the four fuel rods which are at the respective four corners of the square array the corners of the sleeve are rounded as shown and provided with inwardly extending dimples 19 of proper dimension to engage the respective corner fuel rod and hold it against the other three spacer tubes which the fuel rod engages. The corners of the channel 17 are likewise rounded to conform generally with the rounding of the sleeve.

Figure 3:
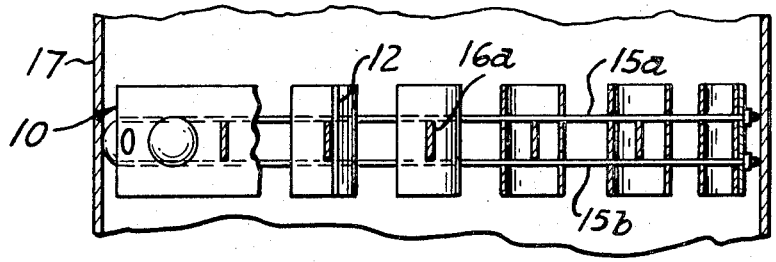
FIG. 3 is a side cross-sectional view showing a modification of the invention.

FIG. 3 is a side sectional view somewhat similar to that of FIG. 2 but showing a modification of the structure of FIGS. 1 and 2. In FIG. 3 the spacer tubes and fuel rods will be arranged in the same array as in FIGS. 1 and 2, but in place of the single tie rods 15, passing through the respective rows of spacer tubes, there are provided two separated tie rods 15a and 15b, extending through the spacer tubes. Furthermore instead of tie rods 16 of circular cross section as shown in FIGS. 1 and 2, there are provided bars 16a of longer dimension vertically than horizontally passing through the columns of the spacer tubes. This arrangement will give increased vertical bending strength as compared with the arrangement of FIGS. 1 and 2, and without decreasing the cross-section for coolant fluid flow. The term "tie rod" as used herein covers both the circular cross section and the bar cross section.

Figure 4:
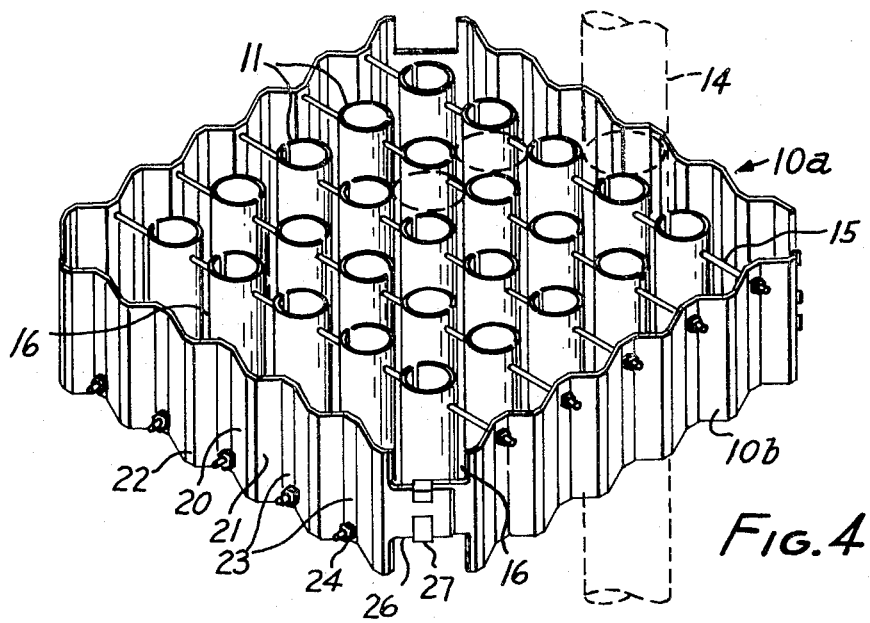
FIG. 4 is an isometric view showing another modification of the assembly of FIGS. 1 and 2.

FIG. 4 is an isometric view of a spacer tube arrangement which is a modification of that shown in FIG. 1. The arrangement of the tie rods 15 and 16 through the spacer tubes is the same as in FIGS. 1 and 2. But in the modification of FIG. 4, only the spacer tubes 11 are used and the smaller spacer tubes 13 shown in FIG. 1 are not used. Elmination of these smaller spacer tubes in the arrangement of FIG. 4 is permitted by the forming of the support sleeve 10a which is used instead of the form of sleeve 10 in FIG. 1 Thus sleeve 10a is given a somewhat serrated form having oblique flat faces 20 and 21 separated by outer folds 22 and by inner flat faces 23 which extend perpendicular and receive respective tie rods. The tie rods, shown passing through the faces 23 of the sleeve are provided at their opposite ends outside the sleeve with a fastener 24 which holds the tie rod to the sleeve by crimping the shank of the fastener against the tie rod.

The positions of the oblique faces 20 and 21 in this assembly is such as to correspond to the positions of the smaller spacer tubes 13 in FIG. 1. Thus, the fuel rods in the assembly engage the respective spacer tubes 14 and also the respective flat faces 20 and 21, these flats in effect being located substantially tangential to what would be the point of contact of the smaller spacer tubes 13 in FIG. 1. The position of these outer fuel rods is indicated by the fuel rod 14 in FIG. 4.

Assembly of the arrangement of FIG. 4 is facilitated by leaving one side 10b open during assembly of the spacer tubes and fuel tubes in the general manner described in connection with FIG. 1, and then completing the enclosure of the sleeve by attaching the side 10b in its position. This can be done by constructing the open ends of the sleeve at this side 10b with end tabs 25 and 26 which overlap each other, the tab 26 being inserted through a slot arrangement 27 formed on tab 25. A similar tab-attaching arrangement is provided at the opposite end of side 10b from that just described. In this arrangement the dimples 18 and 19 shown in FIG. 1 will not be needed as the fold peaks 22 will function to maintain the spacing of the sleeve from the inside of channel 17, which will be used as shown in FIGS. 1 and 2.

Figure 5:
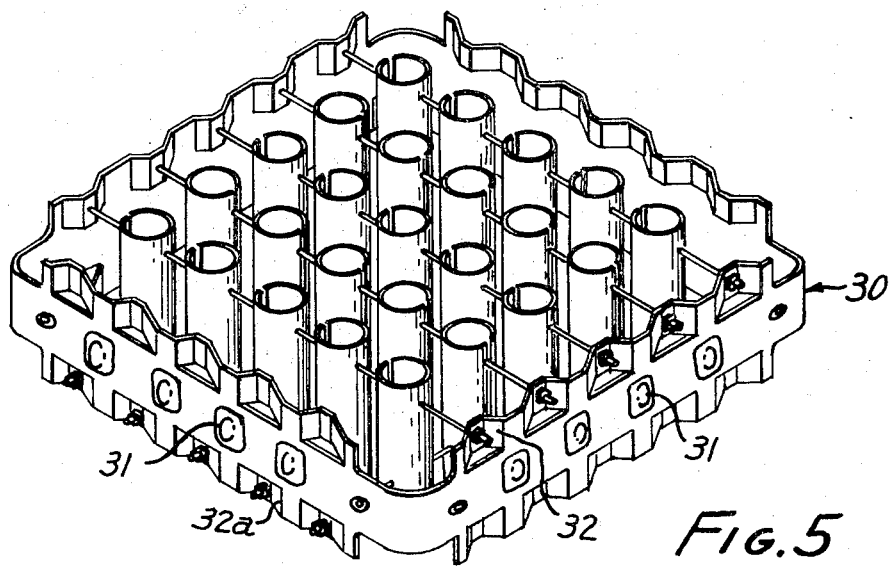
FIG. 5 is an isometric view showing another modification of a fuel rod spacing assembly according to this invention.

FIG. 5 shows another modification from FIG. 4 of the sleeve construction. In FIG. 5, the sleeve is formed in a continuous band 30 around the square array, and is provided with outwardly extending dimples 31, to act as a spacer within the channel 17, (not shown in FIG. 5). Above and below the band 30, the sleeve is formed into inwardly directly folds 32 and 32a, in a configuration similar to that of the entire sleeve 10a of FIG. 4. As in FIG. 4, the tie rods are attached to the inwardly protruding portions of these folds, and the oblique flat portions serve to maintain the fuel tubes in their positions, as in the case of FIG. 4.

Ordinarily there will be more than one of the grid spacers located vertically apart from each other in a nuclear fuel rod assembly, the number of the grid spacers depending on the length of the fuel rods.

It will be recognized that by the present invention, there is provided a fuel tube spacer grid which, by reason of the ability to assemble it row by row with the fuel tubes, avoids the undesirable scratching of the fuel tubes which is likely to occur if the fuel tubes were inserted through a grid which is already assembled. It will be further recognized that the grid structure according to the present invention presents less metallic mass and hence less coolant flow restriction and also less absorption of neutrons than in prior known grid structures.

The simplicity of the arrangements according to this invention as compared with prior-known arrangements which have involved the formation of spring fingers into plates and brazing, followed by age-hardening to obtain spring resilience, will also be recognized.

What is claimed is:

1. The method of assembling a bundle of rod-like fuel elements having a longitudinal length substantially greater than the distance across their cross section with spacing between the individual elements of the bundle, which comprises: supporting a row of the fuel elements spaced from each other near a side of a sleeve which will encompass the fuel elements, providing means for spacing at least the major part of the fuel elements of the row from the sleeve, mounting on a tie rod a row of resilient, slotted spacer tubes at the far side of said row of fuel elements from said side of the sleeve and in contact with sides of the fuel elements, fastening said tie rod to opposite sides of said sleeve at positions such that the spacer tubes on said sleeve are pressurized by contact between the fuel elements and the respective spacer tube to compress their slots.

2. The method according to claim 1 in which successive alternate rows of fuel elements and spacer tubes on tie rods fastened to the sleeve are built up until the area within the sleeve is fully occupied by the fuel elements, spacer tubes and tie rods, leaving spaces along the fuel elements and through the spacer tubes through which coolant fluid can flow.

3. The method according to claim 2 which comprises arranging the spacer tubes in columns substantially perpendicular to the rows and attaching the spacer tubes of each column to a respective tie rod which extends substantially perpendicular to the tie rods on which the rows of spacer tubes are mounted and which are fastened to opposite sides of the sleeve.

* * * * *